(12) United States Patent
Cargnelli et al.

(10) Patent No.: US 6,869,717 B2
(45) Date of Patent: Mar. 22, 2005

(54) MANIFOLD FOR A FUEL CELL SYSTEM (75) Inventors: Joe Cargnelli, Toronto (CA); Jianming Ye, North York (CA)

(73) Assignee: Hydrogenics Corporation, Mississauga (CA)

( * ) Notice: Subject to any disclaimer, the term of this patent is extended or adjusted under 35 U.S.C. 154(b) by 339 days.

(21) Appl. No.: 09/900,468

(22) Filed: Jul. 9, 2001

(65) Prior Publication Data

US 2003/0008194 A1 Jan. 9, 2003

(51) Int. Cl.[7] .............................................. H01M 8/00
(52) U.S. Cl. ............................ 429/34; 429/38; 429/39; 429/35
(58) Field of Search .............................. 429/12, 13, 20, 429/30, 34, 35, 36, 37, 38, 39, 26

(56) References Cited

U.S. PATENT DOCUMENTS

| | | | |
|---|---|---|---|
| 4,670,361 A | | 6/1987 | Tsutsumi et al. |
| 4,873,155 A | | 10/1989 | Hirota et al. |
| 5,023,151 A | * | 6/1991 | Landau et al. ................ 429/24 |
| 5,472,800 A | | 12/1995 | Goto et al. |
| 5,863,671 A | * | 1/1999 | Spear et al. ................... 429/12 |
| 6,013,385 A | * | 1/2000 | DuBose ....................... 429/17 |
| 6,051,331 A | | 4/2000 | Mueggenburg et al. |
| 6,110,612 A | | 8/2000 | Walsh |
| 6,159,629 A | | 12/2000 | Gibb et al. |
| 6,162,554 A | * | 12/2000 | Nolscher et al. .............. 429/13 |
| 6,214,486 B1 | * | 4/2001 | Okamoto ...................... 429/13 |
| 6,531,236 B1 | * | 3/2003 | Hatoh et al. .................. 429/34 |
| 6,541,148 B1 | | 4/2003 | Walsh et al. |
| 6,613,470 B1 | | 9/2003 | Sugita et al. |
| 6,653,008 B1 | | 11/2003 | Hirakata et al. |
| 2002/0168560 A1 | | 11/2002 | Mukerjee et al. |

FOREIGN PATENT DOCUMENTS

| | | |
|---|---|---|
| JP | 164240 | 6/2000 |
| JP | 143734 | 5/2002 |
| WO | WO 0249132 | 6/2002 |

* cited by examiner

Primary Examiner—Bruce F. Bell
Assistant Examiner—Monique Wills
(74) Attorney, Agent, or Firm—Bereskin & Parr (57) ABSTRACT

A manifold for a fuel cell system comprises a plurality of first ports for connecting to fuel cell peripherals; a plurality of ports for connecting to a fuel cell stack; and a plurality of fluid passages within the manifold in communication with the said plurality of ports connecting to the fuel cell peripherals and with the first and second ports for providing, communication of fluids between the fuel cell stack and fuel cell peripherals. The manifold provides a higher degree of system integration, considerably reduced piping, fittings and associated hardware and hence generally reduces the size and weight of the fuel cell system. Thermal-fluid related system losses are also minimized.

18 Claims, 10 Drawing Sheets

MANIFOLD FOR A FUEL CELL SYSTEM

FIELD OF INVENTION

This invention relates to a manifold for a fuel cell system, and more particularly relates to a manifold for mounting peripherals and piping to fuel cell stacks.

BACKGROUND TECHNOLOGY

Fuel cells have been proposed as a clean, efficient and environmentally friendly source of power which can be utilized for various applications. A fuel cell is an electrochemical device that produces an electromotive force by bringing the fuel (typically hydrogen) and an oxidant (typically air) into contact with two suitable electrodes and an electrolyte. A fuel, such as hydrogen gas, for example, is introduced at a first electrode, i.e. anode where it reacts electrochemically in the presence of the electrolyte to produce electrons and cations. The electrons are conducted from the anode to a second electrode, i.e. cathode through an electrical circuit connected between the electrodes. Cations pass through the electrolyte to the cathode. Simultaneously, an oxidant, such as oxygen gas or air is introduced to the cathode where the oxidant reacts electrochemically in presence of the electrolyte and catalyst, producing anions and consuming the electrons circulated through the electrical circuit; the cations are consumed at the second electrode. The anions formed at the second electrode or cathode react with the cations to form a reaction product. The anode may alternatively be referred to as a fuel or oxidizing electrode, and the cathode may alternatively be referred to as an oxidant or reducing electrode. The half-cell reactions at the two electrodes are, respectively, as follows:

The external electrical circuit withdraws electrical current and thus receives electrical power from the fuel cell. The overall fuel cell reaction produces electrical energy as shown by the sum of the separate half-cell reactions written above. Water and heat are typical by-products of the reaction. Accordingly, the use of fuel cells in power generation offers potential environmental benefits compared with power generation from combustion of fossil fuels or by nuclear activity. Some examples of applications are distributed residential power generation and automotive power systems to reduce emission levels.

In practice, fuel cells are not operated as single units. Rather fuel cells are connected in series, stacked one on top of the other, or placed side-by-side, to form what is usually referred to as a fuel cell stack. The fuel, oxidant and coolant are supplied through respective delivery subsystems to the fuel cell stack. Also within the stack are current collectors, cell-to-cell seals and insulation, with required piping and instrumentation provided externally to the fuel cell stack.

In conventional fuel cell systems, extensive piping and plumbing work is required since in operation fuel cell systems rely on peripheral preconditioning devices for optimum or even proper operation. For example, in the situation where the fuel gas of the fuel cell stack is not pure hydrogen, but rather hydrogen containing material, e.g. natural gas a reformer is usually required in the fuel delivery subsystem for reforming the hydrogen containing material to provide pure hydrogen to the fuel cell stack. Moreover, in the situation where the electrolyte of the fuel cell is a proton exchange membrane, since the membrane requires a wet surface to facilitate the conduction of protons from the anode to the cathode, and otherwise to maintain the membranes electrically conductive, a humidifier is usually required to humidify the fuel or oxidant gas before it comes into the fuel cell stack. In addition, most conventional fuel cell systems utilize several heat exchangers in gas and coolant delivery subsystems to dissipate the heat generated in the fuel cell reaction, provide coolant to the fuel cell stack, and heat or cool the process gases. In some applications, the process gases or coolant may need to be pressurized before entering the fuel cell stack, and therefore, compressors and pumps may be added to the delivery subsystems.

These peripheral devices require extensive piping and associated hardware, all of which leads to poor system efficiency. This results from significant energy losses occurring in lines or conduits as more power must be made available for supplementary devices such as pumps, fans, saturators etc, and hence the parasitic load is increased. In addition, hoses, pipes, valves, switches and other fittings increase the overall weight and size of the fuel cell system and complicate the commercial application thereof. This complexity poses problems in many applications, such as vehicular applications, where it is desirable that the piping and weight of the fuel cell system be minimized since strict size constraints exist. Furthermore, in vehicular applications, it is desirable for the fuel cell system to have good transient thermo-fluid response characteristics. This requirement makes it even more difficult to apply conventional fuel cell systems to vehicular applications, where relatively long pathways through hoses, valves, etc., can prevent rapid transient response characteristics being obtained.

Various efforts have been made to simplify the piping of fuel cell systems and hence reduce the size and weight thereof. However, to the applicants' knowledge, there has yet to be disclosed any fuel cell system that solves this fundamental problem.

SUMMARY OF THE INVENTION

In accordance with a first aspect of the present invention, there is provided a manifold for a fuel cell system, comprising:
  a manifold body;
  a plurality of first ports in the manifold body, for connecting to fuel cell peripherals;
  a plurality of second ports in the manifold body, for connecting to a fuel cell stack comprising a plurality of fuel cells and having inlets and outlets for connection to the second ports; and
  a plurality of fluid passages within the manifold providing communication between respective ones of the first ports and respective ones of the second ports, wherein at least one first port is offset from the respective second port and is connected to said respective second port by a passage extending transversely within the manifold body, whereby, in use, the fluid passages communicate fluids between the fuel cell stack and fuel cell peripherals.

Preferably, the body comprises a plurality of layers of plates juxtaposed together, wherein each layer has a plurality of ports and a plurality of fluid passages providing communication between the respective ones of the plurality of ports of the corresponding layer, wherein complementary pairs of ports align and face one another and at least one layer forms an external layer including at least one said first and second ports.

Advantageously, the manifold body comprises:

a first plate layer, including said plurality of first ports;

a second plate layer, including said plurality of second ports;

a third plate layer sandwiched between the first and second plate layers including, a plurality of third ports and a plurality of fluid passages therein, with said plurality of fluid passages providing communication between said third ports and with at least one of said fluid passages extending transversely within the third plate layer, and with the third ports being aligned and in communication with respective ones of the said first and second ports.

Preferably, the third plate layer, further comprises a plurality of plate layers, each of which has a plurality of ports and a plurality of fluid passages providing communication between the ports thereof, with said plurality of ports of each plate layer of the third plate layer being aligned with and in communication with the corresponding ports of an adjacent plate layer.

Alternatively, the manifold body can comprise:

a first plate layer, including said plurality of first ports;

a second plate layer, including said plurality of second ports; a plurality of third ports; and a plurality of fluid passages that communicate between said second and third ports; wherein the first ports extend through the first plate layer and each first port has two open ends, one being for a fuel cell peripheral and the other being aligned with and in communication with a corresponding third port.

According to the present invention, the manifold for a fuel cell system can be formed by pressing the said plates one on top of the other. The fluid passages in the manifold can be formed using the method of melting, etching, or milling. The manifold of the present invention can be manufactured with readily available, cheap materials with adequate heat durability or fluid resistance, including but not limited to, polymer, GE noryl, EN265 and aluminum. Preferably, sealing is provided between each of the said plates. Further sealing means are preferably provided around the said ports for connecting to fuel cell peripherals and said ports for connecting to a fuel cell stack. Advantageously, the manifold for a fuel cell system according to the present invention further includes coolant fluid passages for the manifold to enhance thermal management of the system.

In accordance with another aspect of the present invention, there is provided a fuel cell system comprising, a fuel cell stack including:

a plurality of fuel cells and having a cathode inlet and a cathode outlet for an oxide, an anode inlet and an anode outlet for a fuel gas, and a coolant inlet and a coolant outlet;

a manifold having ports connected to the cathode inlet, the cathode outlet, the anode inlet, the anode outlet, the coolant inlet, and the coolant outlet of the fuel cell stack;

a plurality of additional ports in the manifold including at least a port for an oxidant inlet, a port for a fuel gas inlet, and inlet and outlet ports for the coolant; and a plurality of peripheral devices connected to the additional ports of the manifold.

The manifold according to the present invention provides an interface between the fuel cell stack and heat exchangers, pump, fans, compressors, reformers, humidifiers etc, as well as process gases and coolant delivery components. This configuration can provide a higher degree of system integration, and hence offers a number of advantages. First, flow channels embossed into the manifold eliminate the need for bulky hoses and fittings and therefore the size and weight of the fuel cell system is considerably reduced. Moreover, thermodynamic and fluid flow related losses in the system are reduced, thus improving system efficiency, response to transient conditions and system control. In addition, since piping is minimized, control and maintenance of the system is simplified. Utilizing the invention minimizes all of the aforementioned difficulties because the compact nature of the manifold allows fuel cell systems to be developed for applications where strict size and weight constraints exist.

Fuel cell systems incorporating the present invention are inherently modular, and thus can be easily reproduced in large quantities at dedicated production facilities. Furthermore, the manifold of the present invention can be manufactured using currently available, inexpensive materials, which makes it suitable for manufacturing and mass production.

BRIEF DESCRIPTION OF DRAWINGS

For a better understanding of the present invention, and to show more clearly how it may be carried into effect, reference will now be made to the accompanying drawings, which show, by way of example, preferred embodiments of the present invention. The features and advantages of the present invention will become more apparent in light of the following detailed description of preferred embodiments thereof.

DETAILED DESCRIPTION OF PREFERRED EMBODIMENTS

Figure 1:
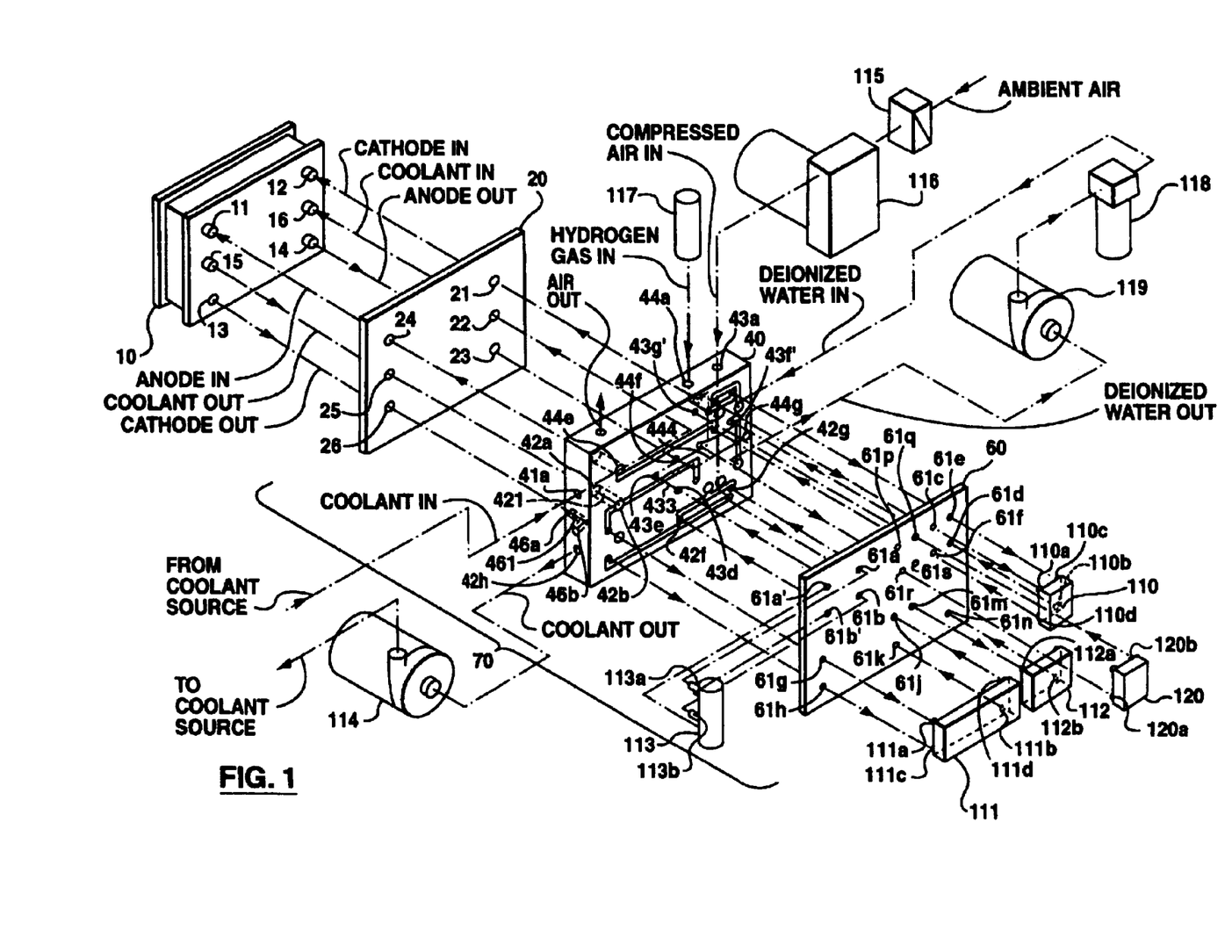
FIG. 1 is an exploded perspective view illustrating a manifold for a fuel cell system according to a first embodiment of the present invention, in which fluid loops are shown.

Now referring to FIG. 1, in which the basic arrangement of manifold assembly 70 according to the first embodiment of the present invention is shown, the manifold assembly 70 comprises of three individual plates. FIG. 1 also shows a fuel cell stack 10 having three inlets and three outlets, specifically, an anode inlet 11 for fuel gas, typically hydrogen, an anode outlet 14 for the fuel gas, a cathode inlet 12 for oxidant gas, typically oxygen or air, a cathode outlet 13 for oxidant gas, a coolant inlet 16 and a coolant outlet 15. It should be appreciated that the fuel cells in the fuel cell stack can be any type of fuel cell, such as, proton exchange membrane fuel cells, solid oxide fuel cells, direct methanol fuel cells, etc. The type of the fuel cells will not affect the design of the manifold according to the present invention.

Figure 4A:
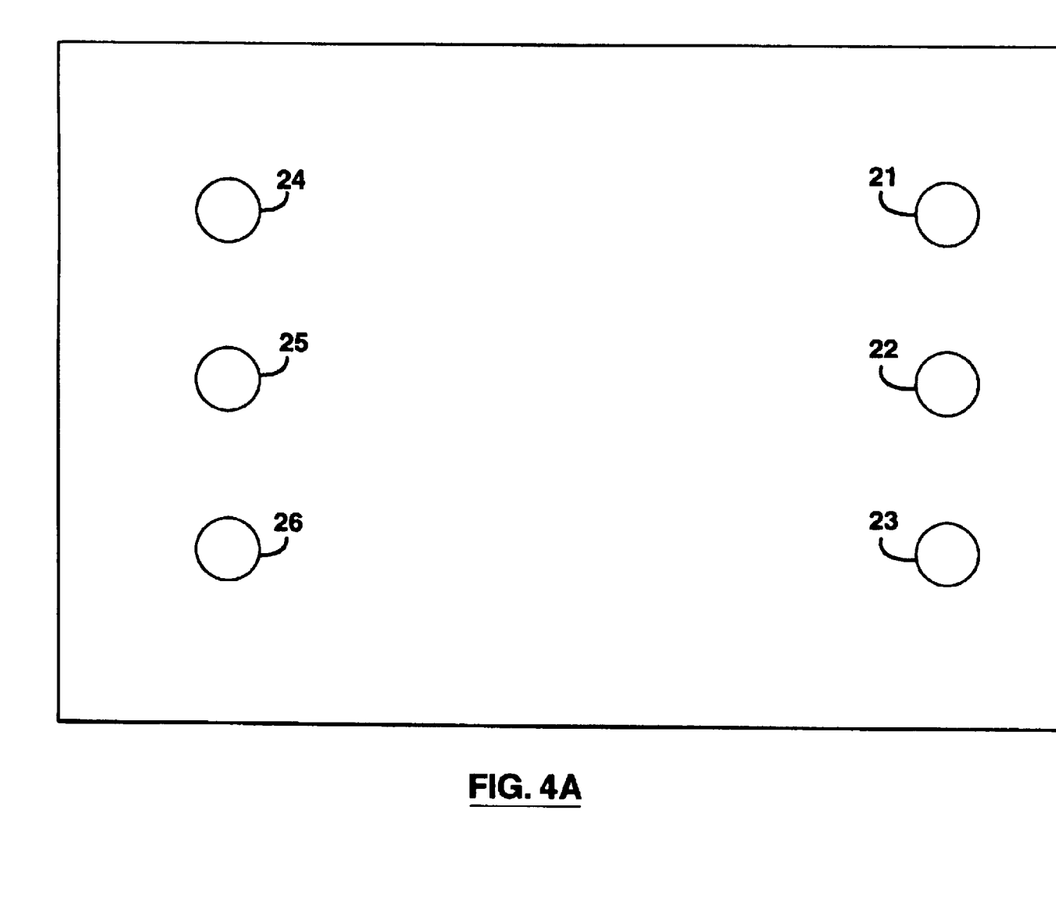
FIG. 4a is a front elevational view of a back plate of the manifold for a fuel cell system according to the first embodiment of the present invention.
Figure 4B:
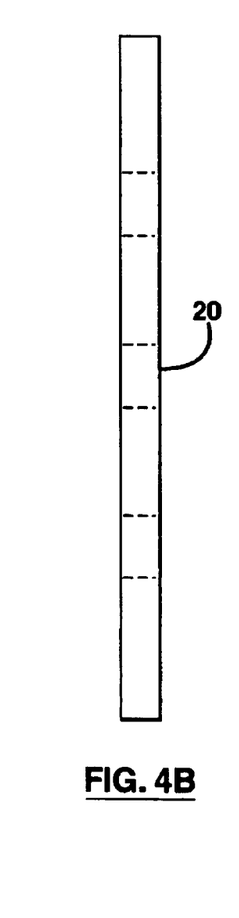
FIG. 4b is a side elevational view of the back plate of the manifold for a fuel cell system according to the first embodiment of the present invention.

In this embodiment, the manifold assembly 70 has three plate layers, namely a front plate 60, a middle plate 40 and a back plate 20. The back plate 20 is formed so that the fuel cell stack 10 can abut against it. The back plate 20 has six ports 21 provided therein, as can be best seen in FIGS. 4a and 4b. In this embodiment, the ports are in the form of six through holes 21 to 26 which penetrate the back plate 20 in the direction of thickness. For illustration only, in this embodiment, the six through holes 21 to 26 are provided in two rows each having three holes arranged in alignment in vertical direction. Each of the three holes in each row is in alignment with the corresponding hole in the other row in horizontal direction. These through holes 21 to 26 are aligned with and adapted to connect to the three inlets 11, 12, 16 and the three outlets 13, 14, 15 of the fuel cell stack 10 so that the fuel cell stack 10 can be mounted on the back plate 20 and the process gases and coolant can be supplied to the fuel cell stack 10 via the fluid passages that will be described below. Conventional sealing and clamping devices are utilized around the six through holes 21 to 26 to prevent leakage of process gases and coolant. It should be mentioned that in this embodiment, for illustration purpose only, the fuel cell stack 1 has three ports near one end and the other three ports near the other end of the stack, which is a typical arrangement in fuel cell stacks, particularly proton exchange membrane fuel cell stacks. Therefore the back plate 20 is configured accordingly. The actual number and arrangement of through holes can be different, and the back plate 20 would then be modified accordingly.

Figure 2A:
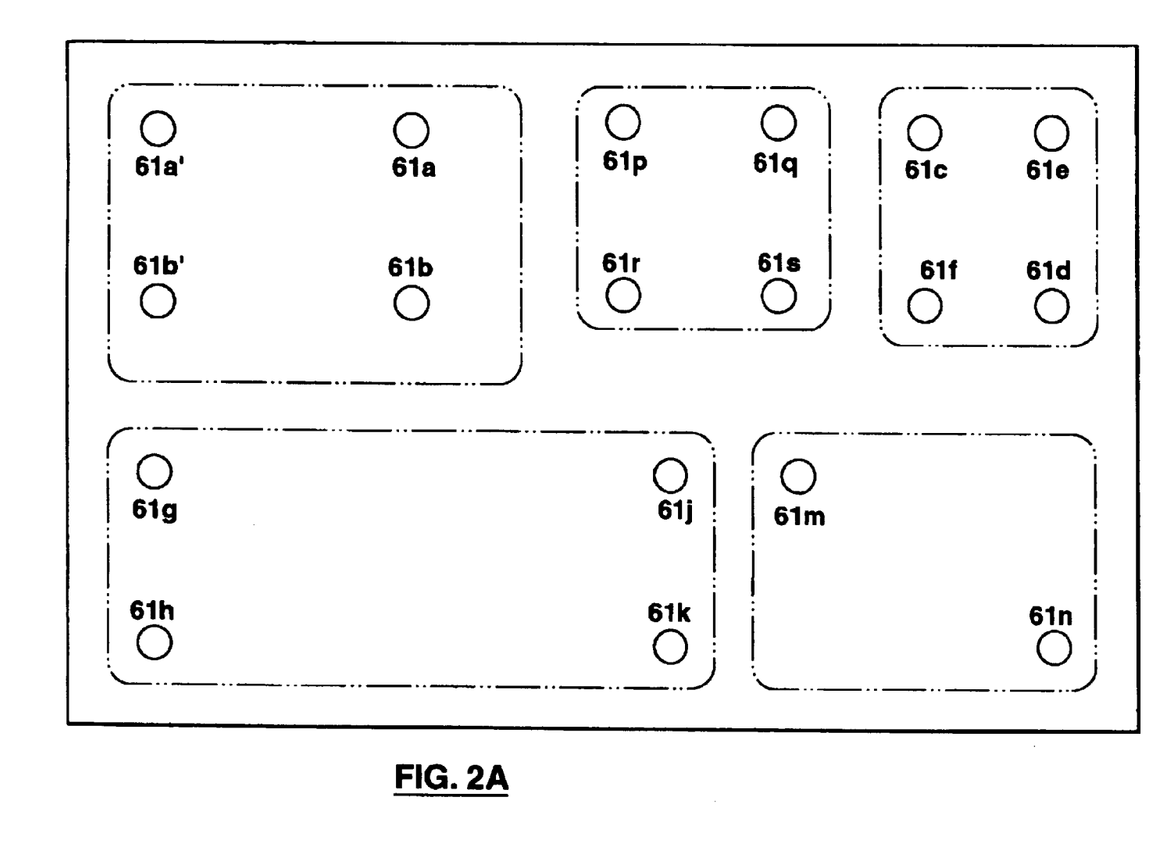
FIG. 2a is a front elevational view of a front plate of the manifold for a fuel cell system according to the first embodiment of the present invention.
Figure 2B:
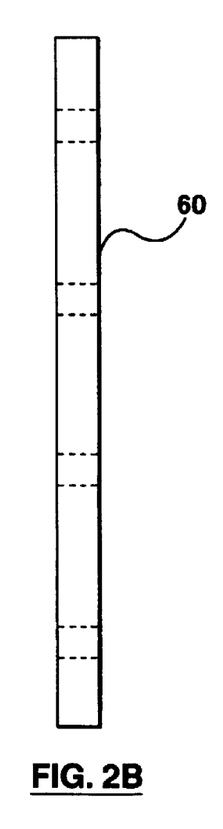
FIG. 2b is a side elevational view of the front plate of the manifold for a fuel cell system according to the first embodiment of the present invention.

As shown in FIG. 1, the front plate 60 is adapted for fuel cell peripherals to mount on it, such as two humidifiers 110, 120 and three heat exchangers 111, 112 and 113. Therefore, in this embodiment, fuel cell stack 10 and fuel cell peripherals are mounted on opposite sides of the manifold assembly 70. It should be understood that the manifold plate can be adapted for mounting peripherals and the fuel cell stack on a same side thereof. The detailed structure of the front plate 60 is shown in FIGS. 2a and 2b. The front plate 60 is provided with a plurality of ports 61. In this embodiment, the ports are in the form of through holes 61a to 61s, which penetrate the front plate 60 in the direction of thickness. In practice the number and arrangement of the ports 61 can be varied as needed. For illustration purposes, in FIGS. 2a and 2b, eighteen through holes 61a to 61s (with references 61l and 61o not being used for clarity) and 61a', 61b' are shown, with those adapted to connect to one peripheral being indicated with a rectangle in dotted lines. Some of the fuel cell peripherals, as shown in this embodiment, are the humidifiers 110, 120 and the heat exchangers 111, 112 and 113, and these are mounted on the front plate 60 so that fluids, gases or other media can be exchanged between the fuel cell stack 10 and the peripherals via internal passages of the manifold assembly 70 as will be described in detail below; the humidifier 110 provides a first or fuel gas humidifier and the humidifier 120 provides a second or oxidant humidifier. In this embodiment, through holes 61a, 61b, 61a' and 61b ' are used to connect to the a first heat exchanger 113, through holes 61c to 61f are used to connect to a first humidifier 110, through holes in 61g, 61h, 61j and 61k are used to connect to a second heat exchanger 111, through holes 61m and 61n are used to connect to the third heat exchanger 112, and the through holes 61p to 61s are used to connect to a second humidifier 120. As required, conventional sealing and clamping devices, such as O-rings are provided around the through holes to prevent leakage. Although in FIGS. 2a and 2b, the through holes are shown in a particular alignment arrangement, the actual arrangement may be different considering other factors in the situation, such as the size of the fuel cell peripherals or the alignment with ports in the middle plate 40. The arrangement of the through holes can be varied, as is required for a particular situation.

Referring to FIGS. 3a to 3d, the middle plate 40 has a plurality of ports and fluid passages provided. The fluid passages can be formed by etching or milling while the ports can be formed by boring or drilling. For simplicity, in FIG. 1 and FIGS. 3A–3D, not all the fluid passages are shown. In general only fluid passages associated with ports visible in the plane of each figure are indicated. Additionally, fluid passages are indicated in two different ways: fluid passages that are internal or below the plane of each figure indicated by dotted lines; fluid passages that are formed as open channels in one of the front and back surfaces of the middle plate 40 are indicated by solid lines, and these channels are then closed by one of the front and back plates 20, 60. Thus, the various fluid passages extend transversely to connect ports that are offset from one another. Alternatively, the various plates 20, 40, and 60 can be formed by molding or casting. As shown in FIG. 1, a complete coolant loop is shown. Coolant is supplied from a coolant source and enters the middle plate 40 through a port 41a provided on the side surface of the middle plate 40, and providing a coolant inlet of the manifold assembly 70. Then the coolant flows along a fluid passage 411 inside the middle plate 40 to a port 41b. As can be best seen in FIG. 3b, the port 41b is a port provided on the surface of the middle plate 40 facing the back plate 20 that communicates with the fluid passages 411 and 412. The fluid passage 412 is provided as an open channel on the surface of the middle plate 40 facing the back plate 20. Therefore, the coolant flows from the port 41b along the fluid passage 412 to the port 41c, which is in alignment with the port 22 of the back plate 20. The ports 41b, c are simply end portions of the passage 412 that align with the ports in the back plate 20. These passages 411, 412 provide a coolant inlet path. The coolant flows through the port 22 and coolant inlet 16 into the fuel cell stack 10. Then the coolant leaves the fuel cell stack 10 through the coolant outlet 13 after flowing through the internal coolant passages of the stack. The coolant flows through the port 25 of the back plate 20, which is in alignment with the coolant outlet 13 and a port 42a provided on the surface of the middle plate 40 facing the back plate 20. Then the coolant continues to flow into the fluid passage 421 through the port 42a to a port 42b provided on the surface of the middle plate 40 facing the front plate 60. Port 42a and fluid passage 421 can be seen in FIG. 1. From port 42b, the coolant flows along two separated fluid passages 422 and 423. The two fluid passages 422 and 423 are provided as open channels on the surface of middle plate 40, and these two streams of coolant will be described separately.

The first stream of the coolant flows along the fluid passage 422 to a port 42c, which is in alignment with port 61g of the front plate 60. The port 61g in turn aligns with an inlet 111a of the second or oxidant heat exchanger 111. This stream of coolant flows through the port 61g and the inlet 111a into the second or oxidant heat exchanger 111. The first stream of coolant then leaves the second or oxidant heat exchanger 111 through an outlet 111b thereof. Then the coolant flows through the port 61k of the front plate 60 and a port 42f of the middle plate 40, both in alignment with the outlet 111b. Then the first stream of the coolant flows along a fluid passage 424 to a port 42e.

The second stream of the coolant flows from port 42b along the fluid passage 423 to the port 42d which is in alignment with the port 61m of front plate 60. The port 61m in turn aligns with an inlet 112a of the third heat exchanger 112. Then this stream of coolant flows through the port 61 m and inlet 112a and enters the third heat exchanger 112. The second stream of coolant leaves the third heat exchanger 112 through the outlet 112b thereof. Then the coolant continues to flow through the port 61n of the front plate 60 and the port 42g of the middle plate 40, both in alignment with an outlet 112b of the third heat exchanger 112. Then the second stream of the coolant flows along a fluid passage 425 to the port 42e. The port 42e is provided on the surface of the middle plate 40 and extends into the inside of the middle plate 40, with passages 424, 425 being open channels and the port 42e being a common end of the channels 424, 425. The confluence of the first and second streams of coolant flows from the port 42e along an internal fluid passage 426 inside of the middle plate 40 to a port 42h from which it returns to the coolant pump 114 and then back to the coolant source. The passages 421–426 provide a return path for the coolant and the port 42h provides a coolant outlet for the manifold assembly 70.

Now the loop of the oxidant, typically air will be described. Referring to FIG. 1, ambient air is usually drawn through an air filter 115 and then an air compressor 116 before it enters the middle plate 40. The compressed air enters the middle plate 40 through a port 43a provided on the side surface thereof and flows along a fluid passage 431 inside of the middle plate 40 to a port 43b. The port 43b is provided on the surface of the middle plate 40 facing the front plate 60 and communicates with the internal fluid passages 431 and a fluid passage 432. The fluid passage 432 is provided as an open channel on the surface of the middle plate 40 facing the front plate 60. Therefore, the air flows from the port 43b along the fluid passage 432 to a port 43c which is in alignment with the port 61h of the front plate 60 and hence an inlet 111c of the second or oxidant heat exchanger 111. Then the air flows into the second or oxidant heat exchanger 111 through the port 43c and the inlet 111c. After exchanging heat in the heat exchanger 111, the air leaves the second heat exchanger 111 through an outlet 111d and continues to flow through the port 61j of the front plate 60 to a port 43d of the middle plate 40. The ports 43d, 61j and the outlet 111d are in alignment with each other. Then the air flows from the port 43d along a fluid passage 433 to a port 43e which is provided on the surface of the middle plate 40 facing the back plate 20. The air flows from the port 43e along a fluid passage 434 provided on the surface of the middle plate 40 facing the back plate 20 to a port 43f. The port 43f is in alignment with the port 21 on the back plate 20 and hence the cathode inlet 12 of the fuel cell stack 10. Therefore the air flows from the port 43f through the port 21 and the inlet 12 into the fuel cell stack for reaction.

The exhaust air flows out of the fuel cell stack 10 from the cathode outlet 13 and enters the manifold assembly through the port 26. A port 46a is provided on the surface of the middle plate 40 facing the back plate 20 and in alignment with the port 26. The exhaust air flows into the port 46a and along an internal fluid passage 461 which takes the exhaust air to a port 46b provided on the side surface of the middle plate 40. Then the exhaust air leaves the manifold assembly 70 and returns to the environment.

Figure 3A:
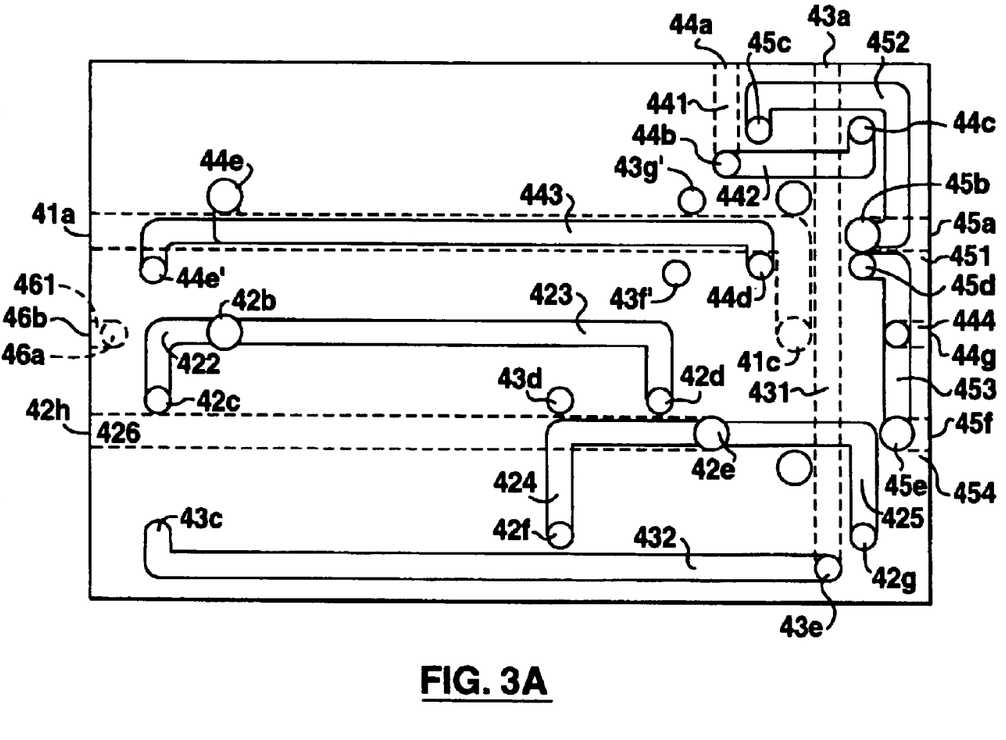
FIG. 3a is a front elevational view of a middle plate of the manifold for a fuel cell system according to the first embodiment of the present invention.
Figure 3B:
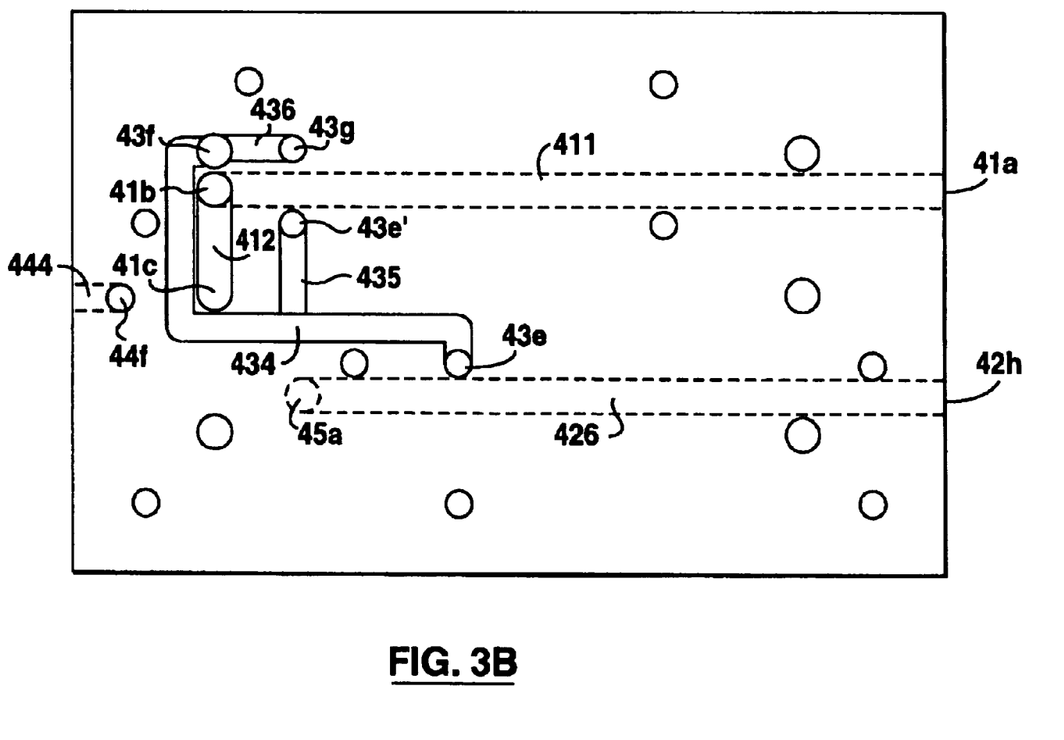
FIG. 3b is a back elevational view of the middle plate of the manifold for a fuel cell system according to the first embodiment of the present invention.
Figure 3C:
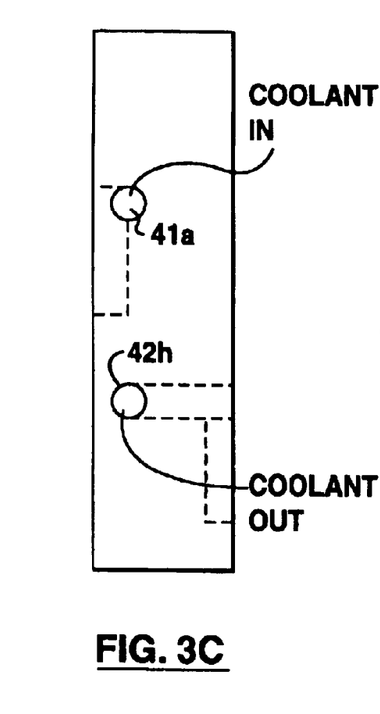
FIG. 3c is a left side elevational view of the middle plate of the manifold for a fuel cell system according to the first embodiment of the present invention, in which some of the fluid passages are shown.
Figure 3D:
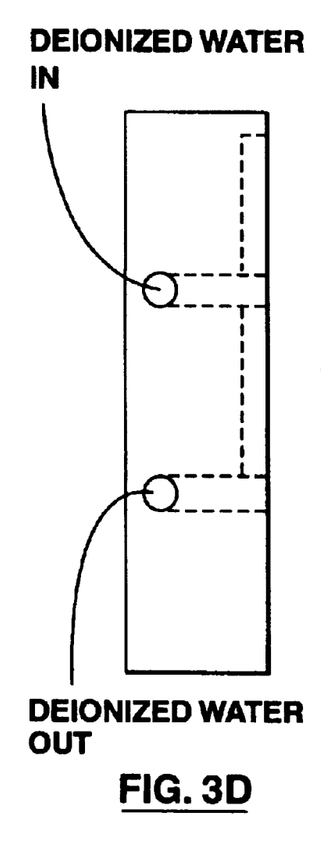
FIG. 3d is a right side elevational view of the middle plate of the manifold for a fuel cell system according to the first embodiment of the present invention, in which some of the fluid passages are shown.

Also, in practice, instead of flowing directly toward the fuel cell stack 10 from the port 43e, the air may flow back to the surface of the middle plate 40 facing the front plate 60 along a fluid passage and then flow through a port on the front plate into a humidifier for humidification. Then, the air flows back into the manifold assembly 70 from the humidifier and flows along appropriate fluid passages in the manifold assembly 70 into the cathode inlet 12 of the fuel cell stack 10. In this situation, second or oxidant humidifier 120 is provided which is mounted onto the front plate at the ports 61p to 61s. The fluid passages and ports also have to be rearranged. For example, the fluid passage 434 does not extend directly from port 43e to 43f. Rather, a fluid passage 435 is provided on the surface of the middle plate 40 facing the back plate 20, as shown in FIG. 3b, which takes the air flow to a port 43e' provided on the same surface. The port 43e' is in communication with a port 43f' provided on the surface of the middle plate facing the front plate 60 via an internal fluid passage. For clarity, this passage is not shown. The said port 43f is in alignment with the port 61r and hence the inlet 120a of the humidifier 120. Then the air flows from the port 43e' into the second oroxidant humidifier 120 through the port 43f' and the inlet 120a. After being saturated, the air leaves the humidifier 120 through the outlet 120b and the port 61q to the port 43g' provided on the surface of the middle plate 40 facing the front plate 60. The port 43g' is in communication with a port 43g on the opposite surface of the middle plate 40 via an internal fluid passage which is not shown for clarity. A fluid passage 436 is provided on the surface of the middle plate facing the back plate 20 and communicates between the said port 43g and said port 43f. Then the air flows from the port 43g' to 43f through the port 43g and the fluid passage 436 and consequently flows into the cathode inlet 12 of the fuel cell stack through the port 21 in the manner described above.

Hydrogen enters the middle plate 40 from a hydrogen storage tank 117 through a port 44a provided on a top surface of the middle plate 40 and then flows along a fluid passage 441 inside the middle plate 40 to a port 44b provided on the surface of the middle plate 40 facing the front plate 60. Then the hydrogen flows along a fluid passage 442 provided as a channel on the surface of the middle plate 40 facing the front plate 40 to a port 44c which is in alignment with the port 61e on the front plate 60 and hence the inlet 110c of the first or fuel gas humidifier 110. Therefore, the hydrogen flows from the port 44c through the port 61e and an inlet 110c into the first or fuel gas humidifier 110 where it is humidified. Then, the humidified hydrogen leaves the first or fuel gas humidifier 110 through an outlet 110d and passes through the port 61f on the front plate 60, which is in alignment with the outlet 110d and a port 44d provided on the surface of the middle plate 40 facing the front plate 60. Then the hydrogen reaches the port 44d from which it continues to flow along a fluid passage 443 provided as an open channel on the surface of the middle plate 40 facing the front plate 60 to a port 44e. The port 44e is a through hole on the middle plate 40 and in alignment with the port 24 of the back plate 20 and hence the anode inlet 11 of the fuel cell stack 10. Therefore, the hydrogen flows from the port 44e through the port 24 and the inlet 11 into the fuel cell stack 10 for reaction.

After reaction, the unreacted hydrogen flows out of the fuel cell stack 10 from the anode outlet 14 and enters the manifold assembly 70 through the port 23. A port 44f is provided on the surface of the middle plate 40 facing the back plate 20. The port 44f is in alignment with the said port 23 and in communication with a port 44g provided on the side surface of the middle plate 40 via an internal fluid passage 444, as shown in FIG. 1. Then the hydrogen flows from the port 23 through the port 44f, fluid passage 444 to the port 44g through which it leaves the manifold assembly 70. Consequently, the hydrogen can be supplied to the inflow stream for recirculation, or vented to the environment. In practice, instead of flowing directly toward the fuel cell stack 10 from the port 44e, the hydrogen may first flow into the first or fuelgas heat exchanger 113. In this situation, the ports and fluid passages have to be rearranged. For example, the fluid passage 443 does not communicate port 44d with port 44e. Rather, it communicates port 44d with a port 44e' (FIG. 3A), which is provided on the same surface and in alignment with port 61b' and hence the inlet 113b of the first or fuel gas heat exchanger 113. Therefore, the hydrogen flows from the port 44d to the first or fuel gas heat exchanger 113 through the port 44e' and 61b'. Then the hydrogen flows back into the manifold assembly 70 from the outlet 113a of the first or fuel gas heat exchanger 113 and port 61a which is in alignment with the said outlet 113a and the port 44e on the middle plate 40. Consequently, the hydrogen flows into the anode inlet 11 of the fuel cell stack 10 in the manner described above.

Typically, deionized water must be supplied to the humidifier, e.g. the humidifier 110 to humidify the process gas, i.e. air or oxygen. A loop for deionized water is also shown in FIG. 1. The deionized water is supplied from a deionized water pump 119. Then it passes a filter 118 and enters the middle plate 40 through a port 45a provided on the side surface thereof. The deionized water flows from the port 45a along a fluid passage 451 to a port 45b, which is provided on the surface of the middle plate 40 facing the front plate 60 and in communication with the fluid passage 451 and a fluid passage 452. The fluid passage 452 is provided as an open channel on the surface of the middle plate 40 and communicates between the port 45b and a port 45c. Therefore the deionized water flows from the port 45b along the fluid passage 452 to the port 45c which is in alignment with the port 61c of the front plate 60 and hence an inlet 110a of the first or fuel gas humidifier 110. The deionized water flows through the port 61c and the inlet 110a into the first or fuel gas humidifier 110 where it humidifies a process gas. Then the residual deionized water leaves the first or fuel gas humidifier 110 through an outlet 110b thereof and passes through a port 61d on the front plate 60, which is in alignment with the outlet 110b and a port 45d provided on the surface of the middle plate 40 facing the front plate 60. Therefore the deionized water reaches the port 45d and flows along a fluid passage 453 provided on the said surface to a port 45e. The port 45e is in communication with an internal fluid passage 454 which in turn in communication with a port 45f provided on the side surface of the middle plate 40. Therefore, the deionized water flows from the port 45e into the internal fluid passage 454 and exits the middle plate through the port 45f from which it returns to the deionized water pump 119.

It is to be noted that the deionized water can also be supplied to the second or oxidant humidifier 120 via appropriate passages for humidifying the air. However, for clarity and simplicity, those passages and the humidifier for air are not shown. In fact, the supply of deionized water to the second or oxidant humidifier 120 can be effected in a manner similar to the supply to the first or fuel gas humidifier 110 for humidifying the hydrogen that has been described above and will have become apparent to those skilled in the art. It is also to be noted that although the heat exchange between the third heat exchanger 112 and any process gases is not described, the third heat exchanger 112 could be used to heat or cool the hydrogen flow. The third heat exchanger 112 could also be used to reheat air or hydrogen flow as desired, after the air or hydrogen is cooled by the second or first heat exchanger, respectively. However, for clarity, the associated arrangement of fluid passages and ports is not shown.

The air compressor 116, coolant pump 114, deionized water pump 119 can be mounted onto the manifold assembly 70 together with other peripherals. However, for a clear understanding of the present invention, they are shown in FIG. 1 separated from manifold assembly 70. The arrangement of the ports and fluid passages are not necessarily identical to that disclosed herein. The number and pattern of ports and fluid passages in this embodiment is only described for illustration purpose.

It should also be appreciated that the heat exchange process and humidification process can be arranged in any order as required in the situation. It is also possible that other fuel cell peripherals, such as enthalpy wheel, DC/AC converter, etc can be coupled to the manifold assembly 70. The arrangement of ports and fluid passages may be varied in accordance with the particular process.

Figure 5:
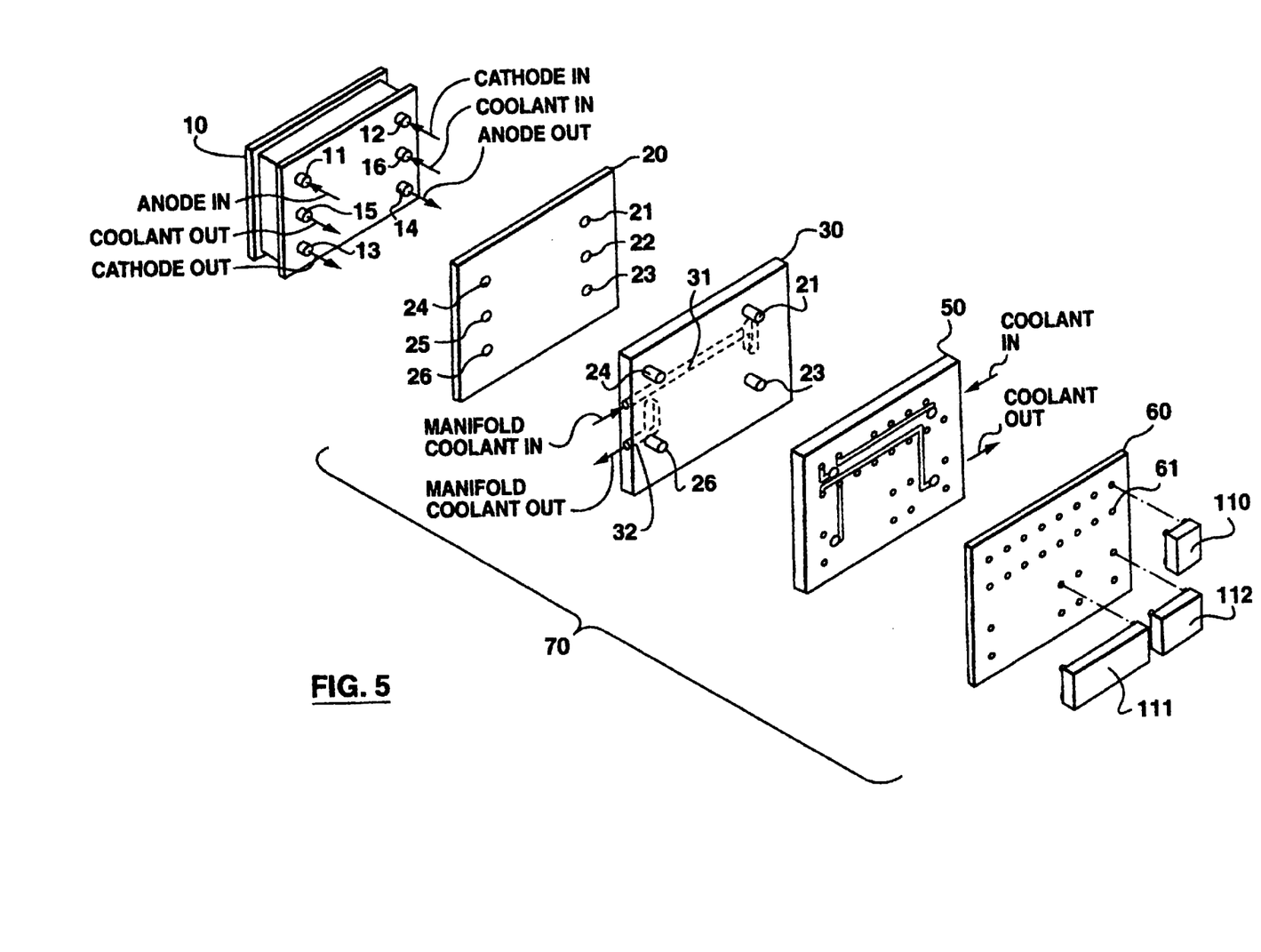
FIG. 5 is an exploded perspective view illustrating a manifold for a fuel cell system according to a second embodiment of the present invention, in which fluid loops are shown.

Now referring to FIG. 5, a second embodiment is shown. It should be appreciated that components similar to those in the first embodiment are indicated using the same reference numbers.

For simplicity and brevity, the description of these components is not repeated. In this embodiment, the manifold assembly 70 includes four layers of separated plates, namely a front plate 60, a first middle plate 50, a second middle plate 30 and a back plate 20. The back plate 20 is formed so that the fuel cell stack 10 can abut against it. The back plate 20, as in the first embodiment, has six ports provided therein, and is the same as that shown in FIGS. 4a and 4b. In this embodiment, the ports are in the form of six through holes 21 to 26 which penetrate the back plate 20 in the direction of thickness. For illustration only, in this embodiment, the six through holes 21 to 26 penetrate the back plate 20. The six through holes 21 to 26 are provided in two rows each having three holes arranged in alignment in vertical direction. Each of the three holes in each row is in alignment with the corresponding hole in the other row in horizontal direction. These through holes 21 to 26 are adapted to connect to the three inlets 11, 12, 16 and the three outlets 13, 14, 15 of the fuel cell stack 10 so that the fuel cell stack 10 can be mounted on the back plate 20 and the process gases and coolant can be supplied to the fuel cell stack 10 via the fluid channels that will be described below. Conventional necessary sealing means and clamping devices can be provided around the six through holes 21 to 26 to ensure proper delivery and prevent leakage of process gases and coolant. It should be mentioned that in this embodiment, for illustration purposes only, the fuel cell stack 10 has three ports near one end and other three ports near the other end thereof, which is a typical arrangement in fuel cell stacks, particularly proton exchange membrane fuel cell stacks. Therefore the back plate 20 is configured accordingly. Of course, the actual number and arrangement of through holes can be different.

Figure 6A:
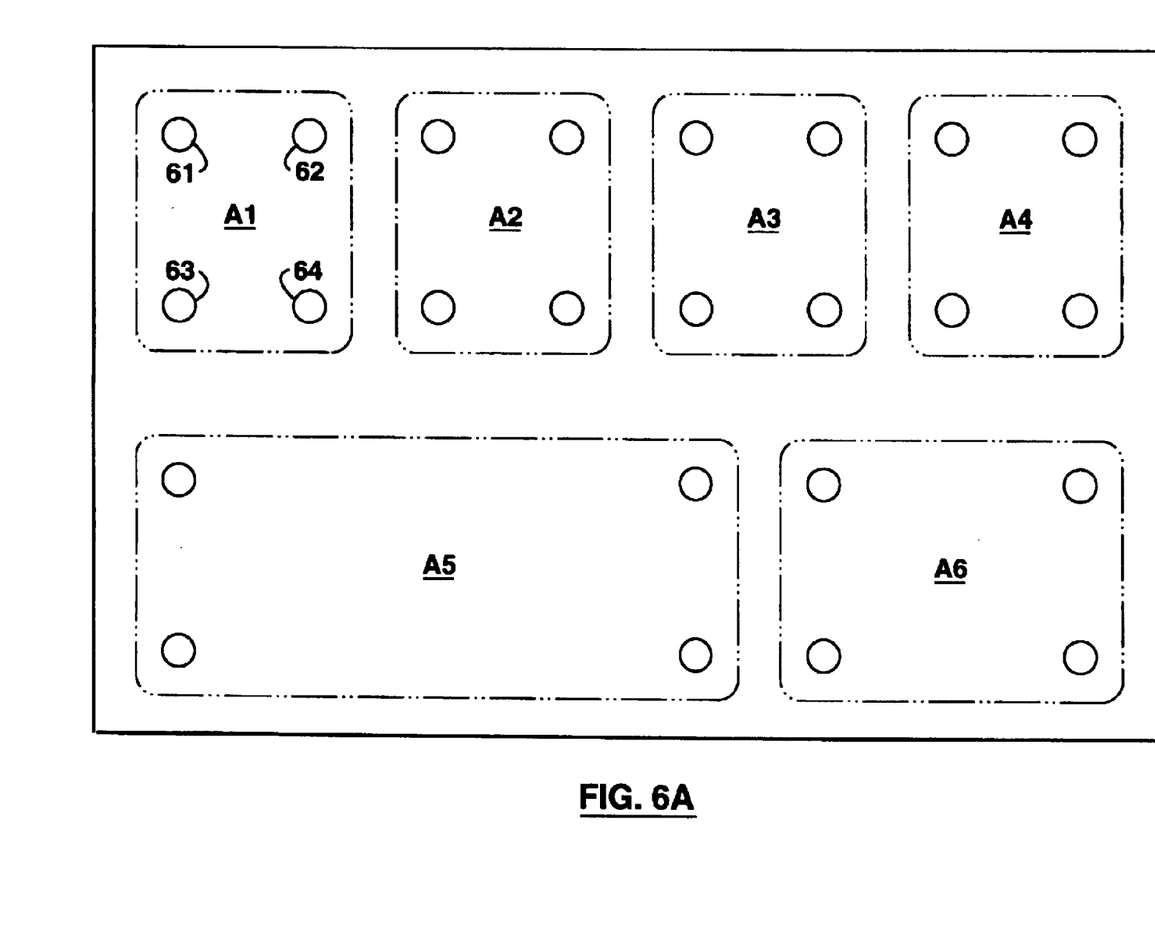
FIG. 6a is a front elevational view of a front plate of the manifold for a fuel cell system according to the second embodiment of the present invention.
Figure 6B:
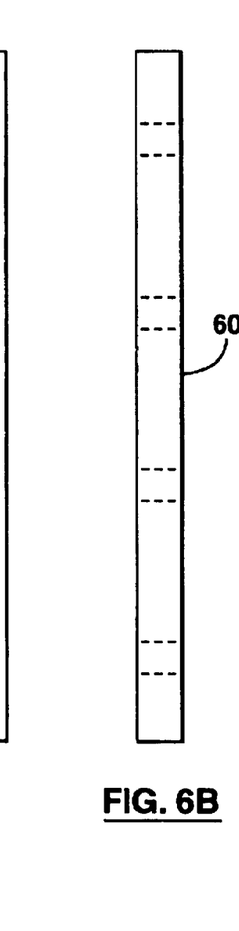
FIG. 6b is a side elevational view of the front plate of the manifold for a fuel cell system according to the second embodiment of the present invention.

As shown in FIGS. 6a and 6b, the front plate 60 is adapted for fuel cell peripherals to mount on it, such as the humidifiers 110, 120 and the three heat exchangers 111, 112 and 113. Therefore, fuel cell stack 10 and fuel cell peripherals are mounted on opposite sides of the manifold assembly 70. The detailed structure of the front plate 60 is shown in FIGS. 6a and 6b. The front plate 60 is provided with a plurality of ports. In this embodiment, the ports are in the form of through holes, which penetrate the front plate 60 in the direction of thickness. Only four through holes are numbered in this figure, namely 61, 62, 63 and 64. In practice the number and arrangement of the said plurality of through holes can vary. For illustration purpose, in FIGS. 6a and 6b, twenty-four through holes are shown with four in one group illustrated with substantially rectangles in dotted lines. Each group of through holes is adapted to connect to ports of fuel cell peripherals. Some of the fuel cell peripherals, as shown in this embodiment, are two humidifiers 110, 120 and three heat exchangers 111, 112 and 113, and these are mounted on the front plate 60 so that fluids, gases or other media can be exchanged between the fuel cell stack 10 and the peripherals via internal passages of the manifold assembly 70, as will be described in details below. For example, through holes in group A4 are used for connecting the first or fuel gas humidifier 110, through holes in group A5 are used for connecting the second or oxidant heat exchanger 111, and through holes in group A6 are used for connecting the third heat exchanger 112. As required, conventional sealing and clamping devices are provided around the through holes to prevent leakage. In FIGS. 6a and 6b, the through holes are shown in alignment arrangement. But in practice, the arrangement of the through holes can be different as is needed in a particular situation.

Referring to FIG. 5, two middle plates 30, 50 are provided between the front plate 60 and the back plate 20. Both of the two middle plates have a plurality of ports and fluid passages. The fluid passages can also be formed by etching or milling while the ports can be formed by boring or drilling; again methods of casting and molding can be used. Now referring to FIG. 7a, on the surface of the first middle plate 50, which is in contact with the front plate 60, fluid passages are provided. In this embodiment, for simplicity, not all the fluid passages are shown. On this surface, blind holes or recesses 51a, 52a, 53a, 54a are also provided. Four open channel fluid passages 51 to 54 are melted or machined on the surface from 51a, 52a, 53a, 54a to 51b, 52b, 53b, 54b, respectively. In this embodiment, 51b, 52b, 53b, 54b are through holes and the blind holes 51a, 52a, 53a, 54a are positioned so that they are in alignment and hence in communication with through holes 61, 62, 63, 64 on the front plate 60, respectively. When fluids, either hydrogen or air enter the manifold assembly 70 from the front plate 60 via through holes 61, 62, 63, 64, they flow to holes 51a, 52a, 53a, 54a and continue to flow along each fluid passage 51, 52, 53, 54 to the through holes 51b, 52b, 53b, 54b from which they leave the first middle plate 50 and reach the second middle plate 30. It will be understood that the fluid passages 51 to 54 are not necessarily melted or machined in the pattern shown in FIG. 7a and other patterns are possible.

Figure 7A:
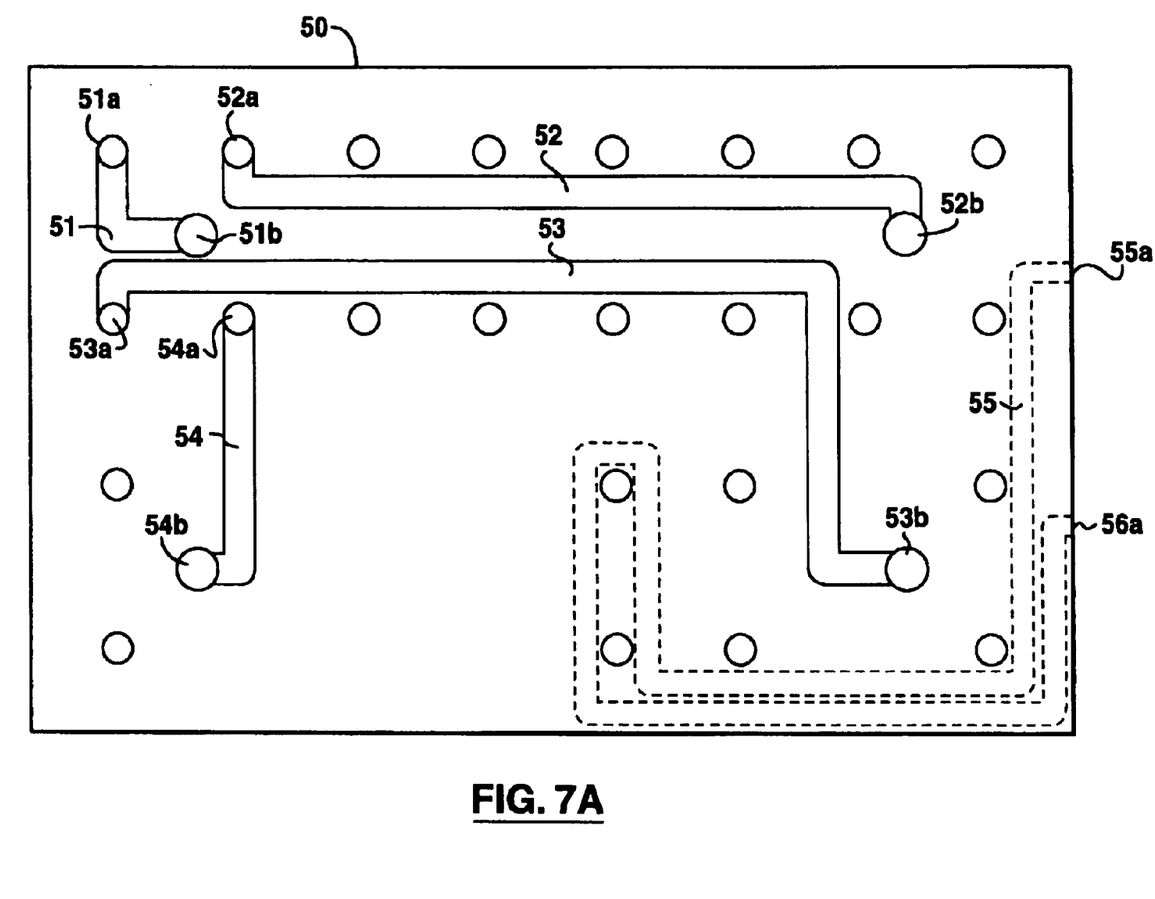
FIG. 7a is a front elevational view of a first middle plate of the manifold for a fuel cell system according to the second embodiment of the present invention.
Figure 7B:
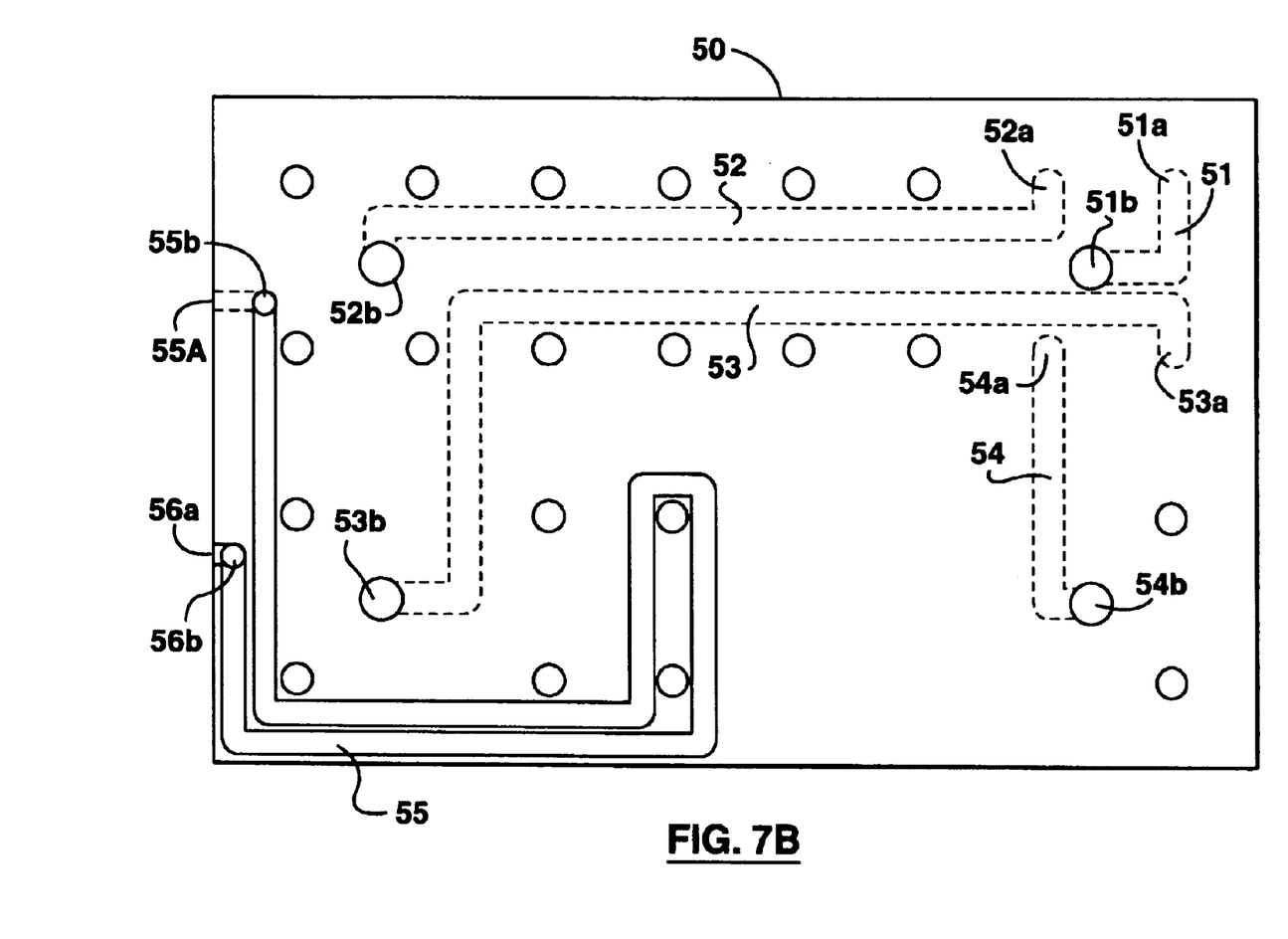
FIG. 7b is a back elevational view of the first middle plate of the manifold for a fuel cell system according to the second embodiment of the present invention.
Figure 7C:
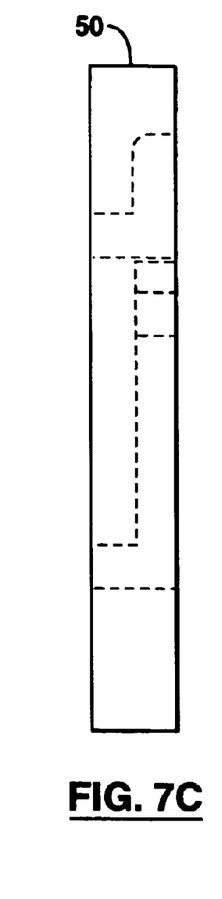
FIG. 7c is a side elevational view of the first middle plate of the manifold for a fuel cell system according to the second embodiment of the present invention.

As also shown in FIGS. 7a to 7c, coolant passages are separately provided. The coolant herein refers to the coolant used in the management of the heat brought to the manifold assembly 70 by the process gases to ensure the proper performance of the manifold assembly 70. As shown in FIG. 7b, in this embodiment, a coolant passage 55 is provided on the back surface of the first middle plate 50, i.e. the surface in contact with the second middle plate 30. Two openings or holes 55a, 56a are provided on one side surface of the plate 40. On the back surface, two blind holes, or recesses 55b, 56b are provided so that the openings 55a, 56a are in communication with the sinking holes 55b, 56b, respectively. The coolant passage, indicated at 55, starts from the blind hole 55b and ends at the blind hole 56b. Therefore a complete coolant loop is formed on the first middle plate 50 with coolant entering the plate via opening 55a and leaving the plate via opening 56a. The coolant passages, in an actual design, are not necessarily in the pattern as shown in the drawings. But rather, the first middle plate 50 may have a large number of coolant passages and the coolant passages may extend to selected areas as needed in the situation. The coolant passages can also be formed by melting or machining. It should be mentioned that none of the fluid passages 51, 52, 53, 54 intercept any of the other fluid passages. Likewise, the coolant passage 55 does not intercept any of the fluid passages.

Figure 8A:
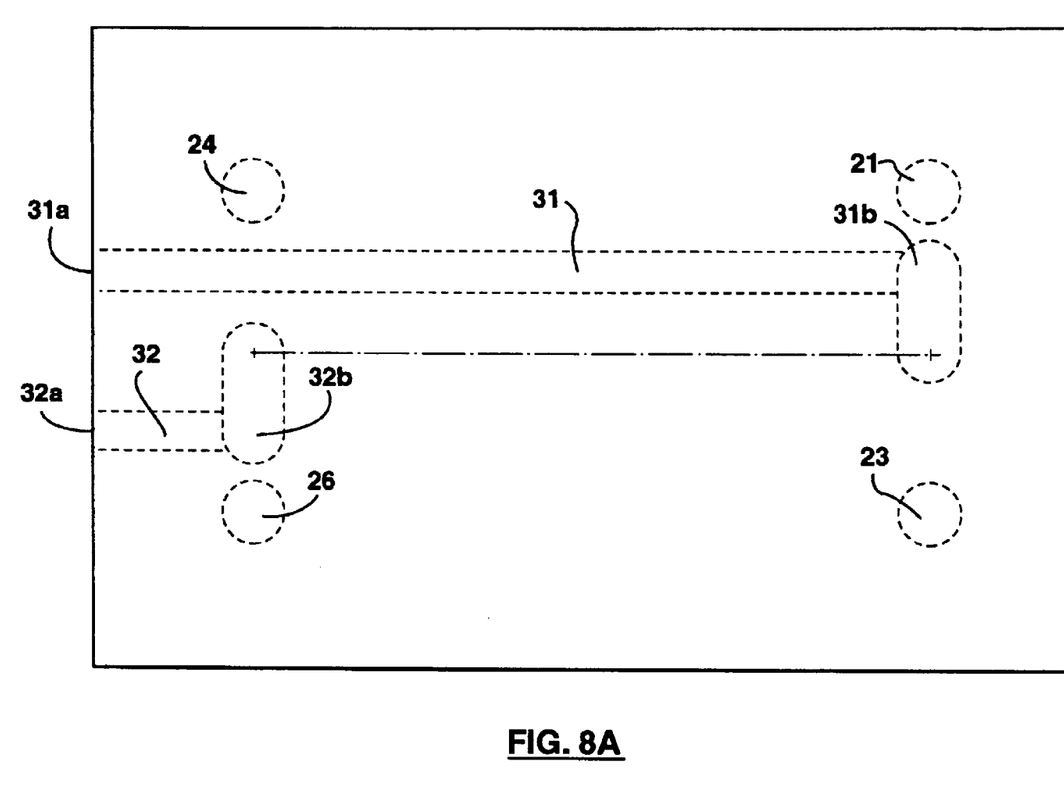
FIG. 8a is a front elevational view of a second middle plate of the manifold a for fuel cell system according to the second embodiment of the present invention.
Figure 8B:
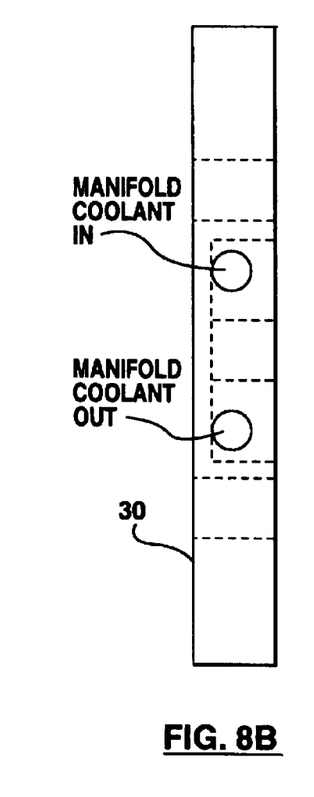
FIG. 8b is a side elevational view of the second middle plate of the manifold a for fuel cell system according to the second embodiment of the present invention.

Now referring to FIGS. 8a and 8b, the second middle plate 30 has two large recesses 31b, 32b provided on the surface which is in contact with the back plate 20. In this embodiment, two internal coolant passages 31, 32 are shown, and these are different from the coolant passage 55 in FIGS. 7a to 7c, which is used for thermal management of the manifold assembly. The coolant passages 31, 32 are used to supply coolant to the fuel cell stack 10. The coolant passages 31, 32 are formed inside of the second middle plate 20. Coolant enters the plate 20 from a coolant source through an opening 31a provided on the side of the plate and flows along a passage 31 to a recess 31b which is in alignment with the port 22 of the back plate 20 and hence the coolant inlet 16 of the fuel cell stack 10. Therefore the coolant flows from the slot 31 through the port 22 and the inlet 16 into the fuel cell stack 10. Then the coolant leaves the fuel cell stack 10 through the coolant outlet 15, which is in alignment with the port 25 of the back plate 20. A recess 32b of the second middle plate 30 is in alignment with the port 25 of the back plate 20 so that the coolant reaches the recess 32b and flows along the passage 32 to the opening 32a from which it leaves the second middle plate 30. It should be appreciated that on the second middle plate 30, a plurality of ports are provided which are in alignment and hence in communication with the ports on the first middle plate 50 so that the fluid can flow through the ports to the second middle plate 30. However, since the fluid communication between the two middle plates 30, 50 is similar to that explained in the first embodiment, those ports on the second middle plate 30 are not shown. The plurality of ports on the second middle plate 30 are in alignment and hence in communication with the through holes 21 on the back plate 20 which in turn communicate with the inlets and outlets of the fuel cell stack 10.

The front plate 60, the first and second middle plates 50, 30 and the back plate 20 are stacked one on top of the other and laminated together using brazing, welding, pressing and any other appropriate methods, such as casting or molding. As will be apparent to those skilled in the art, the back plate 20 can be omitted so that the second middle plate 30 is in direct contact with the fuel cell stack 10. In this case through holes have to be provided on the second middle plate 30 so that the inlets 11, 12, 16 and outlets 13, 14, 15 of the fuel cell stack 10 can be connected onto the second middle plate 30. Apparently, in the first embodiment, the back plate 20 could also be omitted, which results in the third embodiment described below.

Additionally, one or more peripheral components can be mounted to the same face of the manifold or the fuel cell stack. While the invention has been described with one manifold mounted to one fuel cell stack, other combinations are possible. For example, one manifold could be provided for a number of stack assemblies, to enable sharing of peripheral components. On the other hand, one (or more than one) fuel cell stacks could have two or more manifolds; for example, a common stack configuration provides connection ports on both ends, and it may be advantageous to provide a manifold at each end, which manifolds may have different configurations.

The manifold in the present invention can be manufactured with readily available, cheap materials with adequate heat durability or fluid resistance, including but not limited to polymers, such as GE noryl, and EN265, and aluminium.

While the invention has been described as having a number of separate plates, it is possible that a number, or all, of these plates could be integrally molded together. For example, for some applications, it may be possible to form the center manifold by investment casting on the like. In such a case, it may be necessary to provide additional access openings, for the casting process, but this can be readily closed with plugs and the like, and the sealing problems should be significantly lessened.

Additionally, it may be possible to integrate one or more peripheral components, particularly simple components, into the manifold. It is already suggested above that the same heat exchange facility could be provided in the manifold. Particularly, where the manifold is formed from a material with good thermal conductivity, it may be possible to eliminate one or more separate heat exchanges, and possibly integrate other peripheral components into the manifold.

It should be appreciated that the spirit of the present invention is concerned with a novel structure of the manifold for fuel cell systems and its use as an interface between the fuel cell stack and the peripherals. The type and internal structure of the fuel cell stack does not affect the design of the present invention. In other words, the present invention is applicable to various types of fuel cells, electrolyzers or other electrochemical cells. The position, number, size and pattern of those ports provided on the manifold assembly are not necessarily identical as disclosed herein.

It is anticipated that those having ordinary skill in this art can make various modification to the embodiment disclosed herein after learning the teaching of the present invention. For example, the shape of the manifold assembly, the number or arrangement of ports might be different, the materials for making the manifold assembly might be different and the manifold assembly might be manufactured using different methods as disclosed herein. However, these modifications should be considered to fall under the protection scope of the invention as defined in the following claims.

What is claimed is:

1. A manifold for a fuel cell system, comprising:
   a manifold body;
   a plurality of first ports in the manifold body, for connecting to fuel cell peripherals;
   a plurality of second ports in the manifold body, for connecting to a fuel cell stack comprising a plurality of fuel cells and having inlets and outlets for connection to the second ports; and
   a plurality of fluid passages within the manifold providing communication between respective ones of the first ports and respective ones of the second ports, wherein at least one first port is offset from the respective second part and is connected to said respective second port by a passape extending transversely within the manifold body, whereby, in use, the fluid passages communicate fluids between the fuel cell stack and fuel cell peripherals.

2. A manifold for a fuel cell system as claimed in claim 1,
   a manifold body:
   a plurality of first ports in the manifold body, for connecting to fuel cell peripherals:
   a plurality of second ports in the manifold body, for connecting to a fuel cell stack comprising a plurality of fuel cells and having inlets and outlets for connection to the second ports; and
   a plurality of fluid passapes within the manifold providing communication between respective ones of the first ports and respective ones of the second ports, wherein at least one first port is offset from the respective second part and is connected to said respective second port by a passage extending transversely within the manifold body, whereby, in use, the fluid oassaaes communicate fluids between the fuel cell stack and fuel cell peripherals,
   wherein the manifold body comprises a plurality of layers juxtaposed together, wherein each layer has a plurality of ports and a plurality of fluid passages providing communication between the respective ones of the plurality of ports of the corresponding layer, wherein complementary pairs of ports align and face one another and at least one layer forms an external layer including at least one of said first and second ports.

3. A manifold for a fuel cell system as claimed in claim 2, wherein the manifold body comprises:
   a first plate layer, including said plurality of first ports;
   a second plate layer, including said plurality of second ports;
   a third plate layer sandwiched between the first and second plate layers, including, a plurality of third ports and a plurality of fluid passages therein, with said plurality of fluid passages providing communication between said third ports and with at least one of said fluid passages extending transversely within the third plate and with the third ports being aligned and in communication with respective ones of the said first and second ports.

4. A manifold for a fuel cell system as claimed in claim 3, wherein the said third plate layer further comprises a plurality of plate layers-, each of which has a plurality of ports and a plurality of fluid passages providing communication between the ports thereof, with said plurality of ports of each plate layer of the third plate layer being aligned with and in communication with the corresponding ports of an adjacent plate layer.

5. A manifold for a fuel cell system as claimed in claim 2, wherein the manifold body comprises:
   a first plate layer, including said plurality of first ports;
   a second plate layer, including said plurality of second ports; a plurality of third ports; and a plurality of fluid passages that communicate between said second and third ports; wherein the first ports extend through the first plate layer and each first port has two open ends, one being for a fuel cell peripheral and the other being aligned with and in communication with a corresponding third port.

6. A manifold for a fuel cell system as claimed in any of the claims 2 to 5, wherein the manifold body is formed by compressing the said layers one on top of the other together.

7. A manifold as claimed in any one of claims 2 to 5; wherein the manifold is integrally formed by one of casting and molding.

8. A manifold for a fuel cell system as claimed in any of the claims 1 to 5, wherein the fluid passages are formed using a method selected from the group comprising melting, etching and milling.

9. A manifold for a fuel cell system as claimed in any of the claims 2 to 5, wherein a sealing means is provided between each pair of the said layers.

10. A manifold for a fuel cell system as claimed in claim 1, wherein sealing means are provided around the said ports for connection to fuel cell peripherals and to a fuel cell stack.

11. A manifold for a fuel cell system as claimed in any of the claims 1 to 5, which further includes coolant fluid passages within the manifold body.

12. A fuel cell system comprising, a fuel cell stack including:
   a plurality of fuel cells and having a cathode inlet and a cathode outlet for an oxide, an anode inlet and an anode outlet for a fuel gas, and a coolant inlet and a coolant outlet;
   a manifold having ports connected to the cathode inlet, the cathode outlet, the anode inlet, the anode outlet, the coolant inlet, and the coolant outlet of the fuel cell stack;
   a plurality of additional ports in the manifold including at least a port for an oxidant inlet, a port for a fuel gas inlet, and inlet and outlet ports for the coolant; and
   a plurality of peripheral devices connected to the additional ports of the manifold.

13. A fuel cell system as claimed in claim 12, wherein the peripheral devices include at least two heat exchangers, and wherein the manifold includes a coolant inlet path, a coolant return path, and a port providing a coolant inlet and connected through said coolant inlet path to said port connected to the coolant inlet of the fuel cell stack, and wherein said port connect to the coolant outlet of the manifold is connected through said coolant return path to a port of the manifold providing a coolant outlet of the manifold, and wherein the coolant return path includes connections to said at least two heat exchangers, whereby coolant flows through said at least two heat exchangers.

14. A fuel cell system as claimed in claim 13, wherein said set of at least two heat exchangers include an oxidant heat exchanger, wherein the oxidant inlet is connected by the manifold through the oxidant heat exchanger to the cathode inlet of the fuel cell stack, and wherein the manifold provides a connection between the cathode outlet of the fuel cell stack to the surrounding environment.

15. A fuel cell system as claimed in claim 14, wherein the peripheral devices include an oxidant humidifier, and wherein manifold provides for oxidant to flow through the oxidant heat exchanger and the oxidant humidifier to the cathode inlet.

16. A fuel cell system as claimed in claim 14, wherein the peripheral devices include a fuel gas humidifier, and wherein the fuel gas inlet is connected by the manifold through the fuel gas humidifier to the anode inlet of the fuel cell stack, and wherein the manifold includes a fuel gas outlet port and a connection between the anode outlet and the fuel gas outlet port.

17. The fuel cell system as claimed in claim 16, wherein the peripheral devices include a fuel gas heat exchanger, and wherein the manifold provides for fuel gas to flow through the fuel gas humidifier anti the fuel gas heat exchanger to the anode inlet.

18. The fuel cell system as claimed in claim 17, wherein the manifold includes an inlet for deionized water and an outlet for deionized water, and wherein the manifold provides passages between the deionized water inlet and outlet passing through the fuel gas and air humidifiers.

* * * * *

UNITED STATES PATENT AND TRADEMARK OFFICE
CERTIFICATE OF CORRECTION

PATENT NO. : 6,869,717 B2
DATED : March 22, 2005
INVENTOR(S) : Joe Cargnelli and Jianming Ye

It is certified that error appears in the above-identified patent and that said Letters Patent is hereby corrected as shown below:

Column 14,
Lines 23 and 41, replace "part" with -- port --;
Line 24, replace "passape" with -- passage --;
Line 37, replace "passapes" with -- passages --;
Line 43, replace "oassaaes" with -- passages --; and Column 15,
Line 5, replace "layers-," with -- layers, --.

Signed and Sealed this

Twelfth Day of July, 2005

JON W. DUDAS
*Director of the United States Patent and Trademark Office*